(12) United States Patent  
Jordan

(10) Patent No.: US 7,511,368 B2
(45) Date of Patent: Mar. 31, 2009

(54) CARRIER DEVICE FOR ELECTRONIC CHIP

(75) Inventor: Peter Jordan, Basingstoke (GB)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 552 days.

(21) Appl. No.: 11/184,392

(22) Filed: Jul. 19, 2005

(65) Prior Publication Data
US 2006/0022329 A1  Feb. 2, 2006

(30) Foreign Application Priority Data
Aug. 2, 2004 (GB) ................. 0417204.5

(51) Int. Cl.
H01L 23/48 (2006.01)
(52) U.S. Cl. ............... 257/688; 257/E23.086; 257/684; 257/695; 257/701; 439/70; 439/74; 439/330; 439/620
(58) Field of Classification Search ........ 257/E23.086, 257/E23.047, 695, 696, 701, 70, 74, 330, 257/331, 609, 684, 688; 439/70, 74, 330, 439/331, 609, 620
See application file for complete search history.

(56) References Cited
U.S. PATENT DOCUMENTS

| 4,037,270 | A | * | 7/1977 | Ahmann et al. | 361/689 |
| 4,089,575 | A |  | 5/1978 | Grabbe | 439/71 |
| 4,378,139 | A |  | 3/1983 | Griffin et al. | 439/331 |
| 4,571,015 | A | * | 2/1986 | Mueller | 439/64 |
| 4,616,895 | A |  | 10/1986 | Yoshizaki et al. | 439/330 |
| 4,639,058 | A | * | 1/1987 | Morgan | 439/68 |
| 5,226,824 | A | * | 7/1993 | Karlovich et al. | 439/70 |
| 5,249,971 | A | * | 10/1993 | Lai et al. | 439/70 |
| 5,360,353 | A | * | 11/1994 | Kinoshita | 439/620.09 |
| 5,846,098 | A | * | 12/1998 | Shiga et al. | 439/409 |
| 6,232,684 | B1 |  | 5/2001 | Haag et al. | 310/68 R |
| 6,319,025 | B1 | * | 11/2001 | Sudo | 439/83 |
| 6,400,551 | B1 | * | 6/2002 | Lin et al. | 361/301.3 |
| 6,473,291 | B1 |  | 10/2002 | Stevenson | 361/306.3 |
| 6,540,561 | B1 | * | 4/2003 | Masumoto | 439/660 |
| 6,793,506 | B1 | * | 9/2004 | Hirata et al. | 439/74 |
| 7,156,679 | B1 | * | 1/2007 | Wang et al. | 439/330 |
| 2001/0014548 | A1 | * | 8/2001 | Matsukawa | 439/74 |

FOREIGN PATENT DOCUMENTS

| EP | 1 193 839 A2 | 3/2002 |
| GB | 2 122 429 | 1/1984 |
| JP | 8273781 | 10/1996 |

* cited by examiner

Primary Examiner—Chris C. Chu
(74) Attorney, Agent, or Firm—Peter Van Winkle

(57) ABSTRACT

A surface mount electronic chip (10) is mounted on a holder (70) and electrically connected to holder terminals (74, 76, 80) by the use of a carrier device (30). The carrier device has clips (36) mounted on walls of the carrier frame. The chip is merely pressed into a cavity (48) between inner tabs (44) of the chips. The carrier with the chip in place is merely pressed into a cradle (78) formed in the holder by the holder terminals, so outer tabs (46) of the clips press against the holder terminals.

9 Claims, 3 Drawing Sheets

CARRIER DEVICE FOR ELECTRONIC CHIP

CROSS-REFERENCE

Applicant claims priority from British patent application GB 0417204.5 filed Aug. 2, 2004.

BACKGROUND OF THE INVENTION

Low-pass EMI filters are widely used to suppress interference. Such filters have used multilayer capacitors in the form of surface mount chip capacitors, and entire EMI filters have been available as surface mount chips.

One example of an electronic chip is an EMI filter for interference suppression within a motor housing. It is known to mount such a filter directly within a conductive outer casing for a motor as in automotive applications. There may be as many as 100 motors in a present luxury automobile. The RF emissions of DC motors are a significant problem, as an electrical motor is a noisy RF source that can easily interfere with other electronic devices through common and differential mode noise on the power lines. For noise above a certain frequency on the power lines, the power lines tend to act as an antenna and radiate energy into free space. Substantial RF noise is generated from a small DC motor by the high speed switching which occurs at angular velocities as high as 24,000 rpm at 12 V DC. EMI filters are used to suppress the RF noise at the source.

One known layout for a chip capacitor EMI filter comprises a rectangular casing, with connections at each end wall and connections at opposite side walls. These connections are for example tin-lead coating layers. This chip is typically soldered into a carrier provided with the motor housing. In motor applications, there are particularly harsh environmental demands, and the installation must be able to withstand large thermal shock as well as technical vibration. The conventional mounting technique may not meet these demands.

SUMMARY OF THE INVENTION

In accordance with one embodiment of the invention, applicant provides apparatus for supporting and making connections to an electronic chip, which provides easy installation and secure holding of the chip. The apparatus includes a carrier device comprising a dielectric frame with four walls forming a cavity with an open top. A plurality of sheet metal spring clips each has a 180° bend mounted on the top of a wall, and has inner and outer tabs. The inner tabs engage contact pads of the chip while the outer tabs engage terminals of a holder that holds the frame. The chip is installed by merely pushing it into the cavity, and the carrier device is installed by merely pushing it between terminals of the holder.

Each inner tab of a clip can be formed with a finger that projects into a recess in a corresponding frame wall, to lock the clip in place. A contact bump can be provided on the inner tab.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
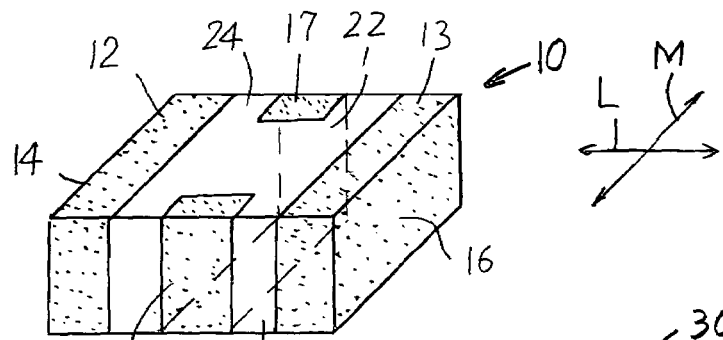
FIG. 1 is an isometric view of a known package design for an EMI suppression electronic chip.

FIG. 1 shows an electronic chip 10 which is an EMI suppression chip, designed as a surface mount component. The chip has positive and negative chip contacts 12, 13 forming contact pads 14, 16 that lie at laterally L opposite sides of the chip, and has a ground contact 17 with portions in the form of contact pads 20, 22 on longitudinal M opposite sides of the chip. The chip also has top and bottom surfaces 24, 26.

Figure 2:
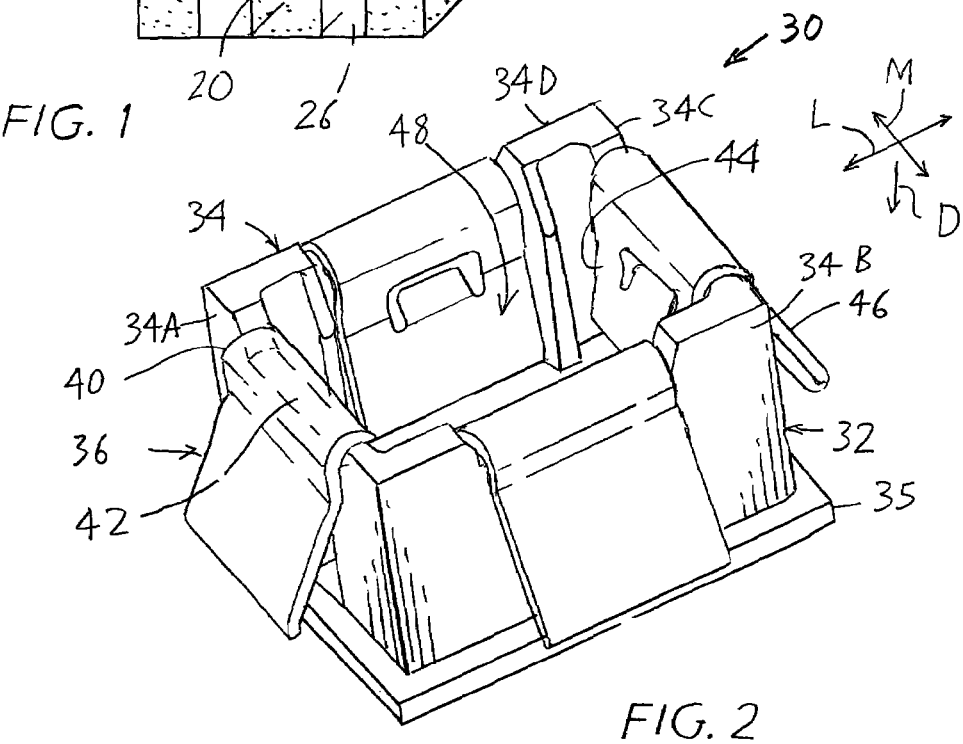
FIG. 2 is an isometric view of a carrier device of the invention.

FIG. 2 shows a carrier device or carrier 30 which receives the suppression chip of FIG. 1 in a simple press fit connection. The carrier device includes a dielectric (insulative) frame 32 which is shaped as a rectangular container having four side walls 34 respectively labeled 34A-34D and an open top, and with a base 35. The carrier device also includes four sheet metal contact clips 36, each including an approximately 180° bent part 40 mounted on the top edge 42 of a side wall of the frame. Each spring clip has inner and outer tabs 44, 46 that extend largely downward D from opposite ends of the bent part. The inner tabs connect to contact pads of the chip, while the outer tabs connect to terminals of a holder that holds the carrier device. The space between the four side walls of the carrier frame, and between the inner tabs of the clips, forms a cavity 48 for receiving the chip.

Figure 3A:
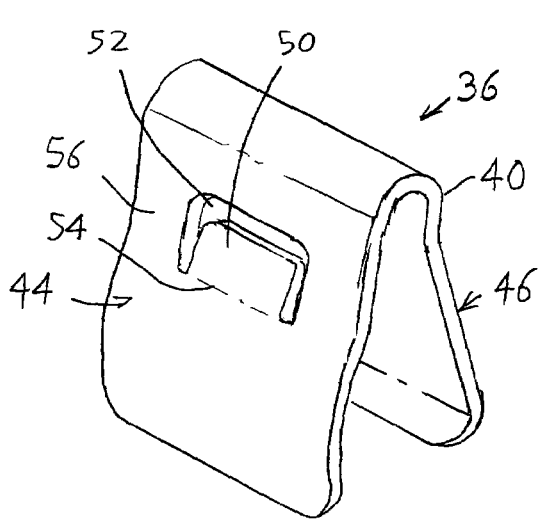
FIG. 3A is an isometric view of a spring clip of the carrier device of FIG. 2.
Figure 3B:
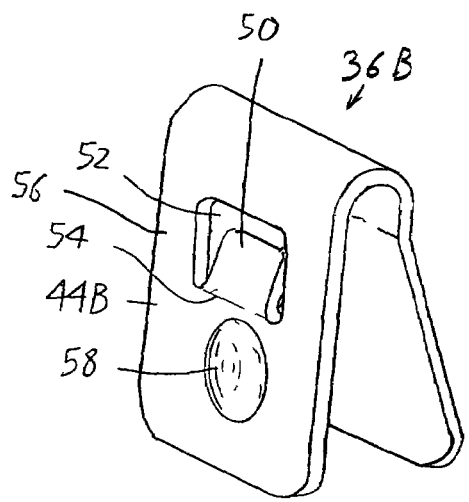
FIG. 3B is an isometric view of a spring clip of another embodiment of the invention.

FIGS. 3A and 3B show spring clips 36, 36B of different designs, with the clip of FIG. 3A shown in FIG. 2. In each design, the inner tab 44, 44B has a locking finger 50 formed by a cutout 52 and bend 54 in the surrounding area 56 of the inner tab. The locking finger is bent to extend at an incline and into a slot of the carrier frame, to hold the clip on the frame. In FIG. 3B the inner tab has a convex bump 58 on its inner face to provide a definite contact location against a holder terminal.

Figure 4:
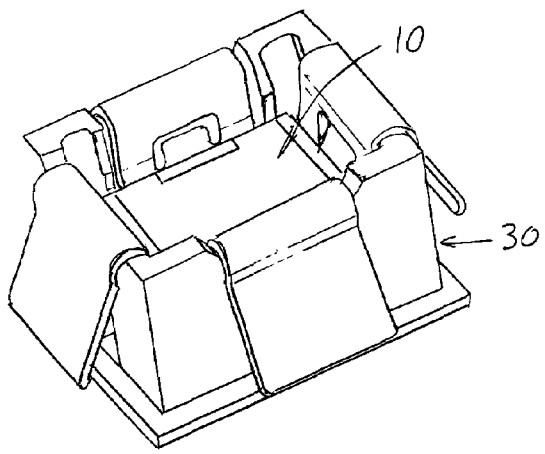
FIG. 4 is an isometric view of the carrier device of FIG. 2, with the electronic chip of FIG. 1 installed thereon.
Figure 5:
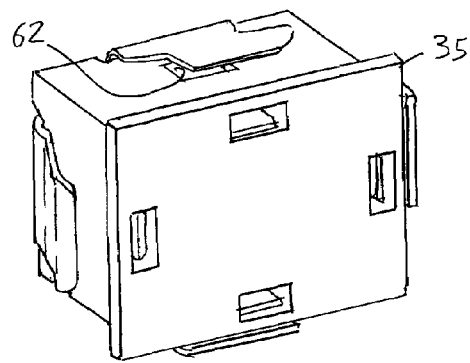
FIG. 5 is an isometric view showing the underside of the carrier device of FIG. 4.

FIG. 4 shows the electronic chip 10 of FIG. 1 fully installed in the carrier device 30 of FIG. 2. The inner tab of each of four spring clips makes electrical contact with one of the contact pads of the chip, and soldering is not required. FIG. 5 shows that the carrier frame has a bottom or base 35. FIG. 5 also shows that each side wall has a recess, or slot 62 for receiving a finger of the inner tab of a clip. When the chip is installed in the carrier cavity, the inner tabs are biased outward and the locking fingers are securely pressed into the slots. The slots can extend fully or only partially into the carrier walls.

Figure 6:
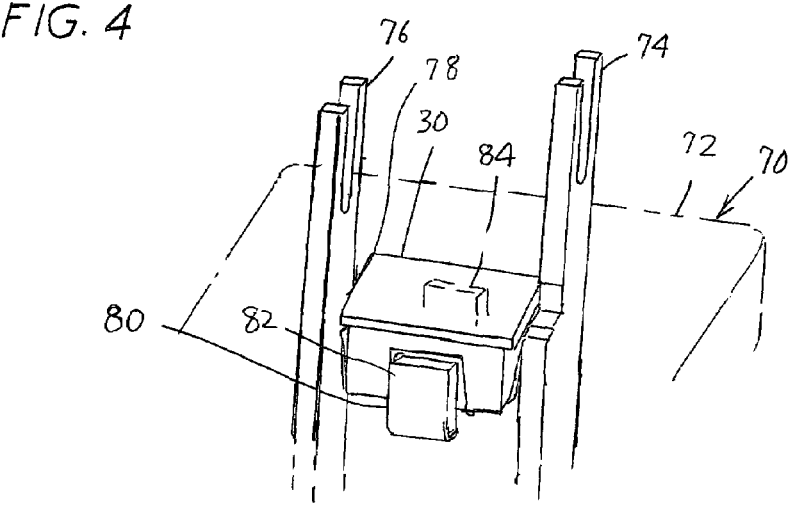
FIG. 6 is a partial isometric view of a holder with the carrier device and chip of FIG. 4 installed thereon.

FIG. 6 shows a holder 70 with a housing 72 for receiving the carrier device 30. The holder has positive and negative terminal 74, 76, as well as a ground terminal 80 with opposite sides 82, 84. The terminals form a cradle 78 in the space between the terminals, including the opposite sides of the ground terminal, that receives the carrier device in a push fit with soldering not required.

Figure 8:
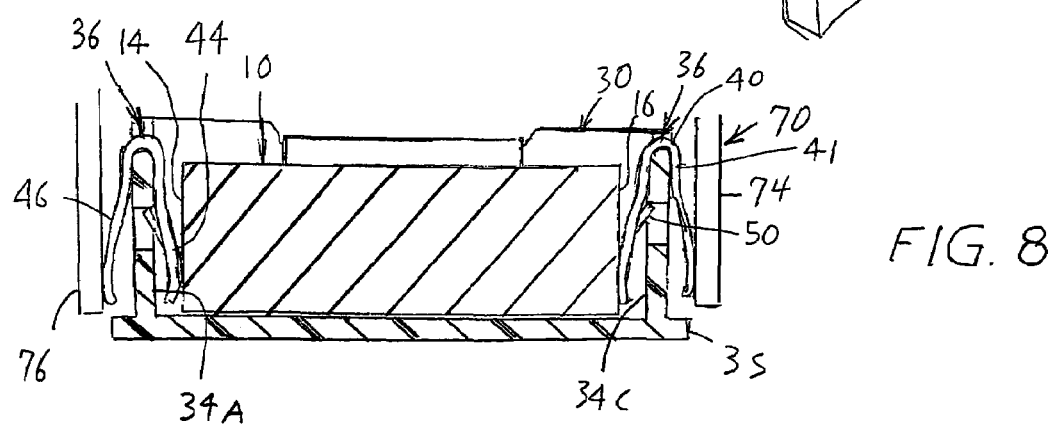
FIG. 8 is a sectional side view of a portion of the holder of FIG. 6 with the carrier device and chip thereon.

FIG. 8 shows that when the carrier device 30 lies in the holder 70, and with the electronic chip 10 in the carrier device, the tabs 44, 46 of the spring clips 36 are resiliently deflected toward corresponding carrier walls 34A, 34C by a pair of holder terminals 74, 76 and a pair of chip contact pads 14, 16. The ground contact pads and terminals that lie at longitudinally opposite sides of the carrier deflect corresponding clips. In this way, the spring clips provide mechanical retention of the chip in the carrier device and mechanical retention of the carrier device in the holder. As the same time, the clips provide an electrical connection between each chip contact pad and one of the holder terminals, using only a single element which is a clip. The approximately 180° bend (135° to 235°) 40 at the top of each clip results in bend part sides 41 that lie closely adjacent to opposite sides of the frame wall.

The base 35 of the frame of the carrier device projects beyond the side walls. This enables easier latching of the carrier device to the holder.

Figure 7:
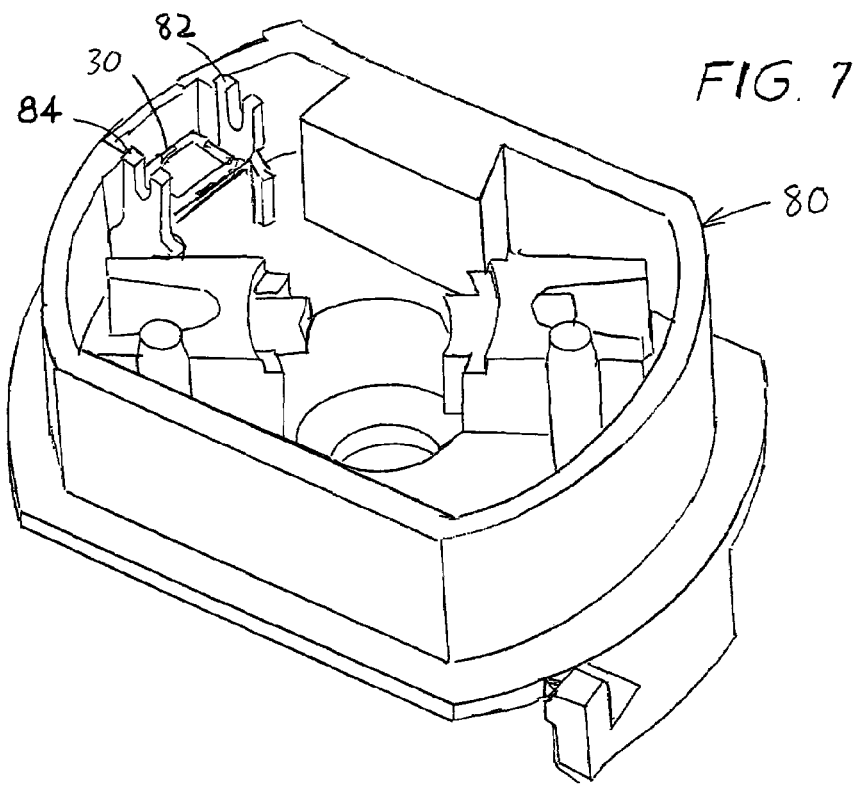
FIG. 7 is a partial isometric view of a motor housing with the carrier device and chip of FIG. 4 installed thereon.

FIG. 7 shows an example of a holder in the form of a motor casing 80 which functions as a Faraday cage, with the carrier device 30 mounted in the motor casing. The carrier device lies between terminal 82, 84 of the motor.

The clips are formed of sheet metal and are preferably plated with a corrosion resistant and conductive material, such as silver. The clips are shown mounted by the approximately 180° bent part lying over the top of a carrier wall. A clip with inner and outer tabs that are deflected toward a carrier frame wall, can be mounted in other ways. For example, the clip can be mounted in a slot of a carrier frame wall.

Although terms such as "top" and "bottom" have been used to describe the invention as it is illustrated, the invention and its parts can be used in any orientation.

Thus, the invention provides a means for electrically and mechanically mounting a surface mount electronic chip so it lies securely on a holder and electrically connects to terminals of the holder. This is accomplished by use of a carrier device which has walls forming a cavity and which holds a plurality of sheet metal clips at a plurality of the walls. Each clip has inner and outer tabs. The chip can be installed on the carrier by merely pushing it into the cavity. The carrier can be installed on the holder by merely pushing the carrier into a cradle on the carrier formed between terminals of the holder. Each clip inner tab is pressed outward by the force of a chip contact pad on an inner tab, and each clip outer tab is pressed inward by the force of a holder terminal against the outer tab. The electrical and mechanical connections are made by merely pushing the chip into the carrier device and by merely pushing the carrier device into the cradle formed in the holder (between the holder terminals). Solder connections are not required.

The novel features of the invention are set forth with particularity in the appended claims. The invention will be best understood from the following description when read in conjunction with the accompanying drawings.

What is claimed is:

1. Apparatus for supporting and making electrical connections to an electronic chip, wherein the chip is of parallelopiped shaped with a top and a bottom, the chip having laterally opposite chip sides and longitudinally opposite chip sides, said chip having a plurality of contact pads at said laterally opposite chip sides:

a dielectric carrier device frame having laterally opposite side frame walls and a bottom base, said frame walls and base forming a chip-receiving region with an open top;

a plurality of spring clips mounted on said frame, each clip formed of a piece of sheet metal having a bend of about 180° and having inner and outer tabs at opposite sides of the bend, each clip mounted on one of said frame walls with the inner tab of the clip lying in said region with the outer tab of the clip lying outside the cavity and with the bend lying loosely on the frame wall, and the bend being resilient to transmit forces between the tabs;

said chip lying in said cavity, with each of a plurality of said chip contact pads lying against one of said inner tabs of a spring clip to urge the inner tab toward a corresponding one of said frame walls and thereby urge the outer tab away from that frame wall.

2. The apparatus described in claim 1 including:

a holder having a housing and at least a pair of laterally opposite holder terminals mounted on the housing, said frame walls lying between said terminals with the outer tabs of a pair of said clips each lying against one of said holder terminals and, through said bend, urging the inner tabs of said clips toward a corresponding one of said chip pads.

3. The apparatus described in claim 1, wherein:

said bend of each clip extends around the top of a corresponding wall of the frame walls.

4. The apparatus described in claim 3, wherein:

the bend of each of said clips is 180°, and the tabs of each clip have upper end portions that are parallel and that lie at opposite sides of upper portions of the corresponding frame wall on which the clip is mounted.

5. Apparatus for supporting and making electrical connections to an electronic circuit chip, wherein the chip is of parallelopiped shape with top and bottom surfaces, laterally opposite side surfaces, and longitudinally opposite side surfaces, and with the chip having contact pads on a plurality of said side surfaces, comprising:

a dielectric carrier device frame having four side walls and a bottom wall and forming an upwardly open cavity within said side walls;

a plurality of sheet metal clips that each has about 180° bend that straddles upper ends of said side walls and that forms inner and outer tabs that respectively lie inside and outside said cavity, said cavity being of a size to receive said chip with a plurality of contact pads of said chip pressing. against a plurality of corresponding ones of said inner tabs and deflecting said inner tabs outwardly toward a corresponding one of said carrier side walls;

a holder having a dielectric housing and a plurality of holder terminals mounted on said housing, said carrier being insertable between said holder terminals, with said holder terminals engaging the outer tabs of each of a plurality of said chips and deflecting said outer tabs inwardly toward a corresponding one of said carrier side walls.

6. The apparatus described in claim 5 including said electronic circuit chip, and wherein:

said chip lies in said cavity with said chip contact pads pressing against said inner tabs.

7. The apparatus described in claim 5 wherein:

said inner tabs of said clips each has a main portion and has a finger formed by a cutout in the main portion, each finger having a lower end joined by a bend to the main portion of the inner tab so the finger extends at an upward-inward incline from the main portion, and the finger has a free upper end that engages one of said side walls of the frame.

8. Apparatus for supporting and making electrical connections to an electronic chip, wherein the chip is of parallelopiped shape with a top and a bottom, the chip having laterally opposite chip sides and said chip having a plurality of contact pads each lying at one of said chip sides:

a dielectric carrier device frame having laterally opposite side walls and a bottom base, said walls and base forming a frame cavity with an open top;

a plurality of spring clips mounted on said frame, each clip formed of a piece of sheet metal having a bend of about 180° and having inner and outer tabs at opposite sides of the bend, each clip mounted on one of said walls with the inner tab of the clip lying in said cavity and the outer tab of the clip lying outside the cavity;

said chip lying in said cavity, with each of a plurality of said chip contact pads lying against one of said inner tabs of a spring clip to urge the inner tab toward a corresponding one of said frame walls;

the inner tab of each clip has a locking finger that is formed by a cutout in the tab that leaves a finger with a free top end, each finger extending at an upward and outward incline to press against the corresponding frame wall.

9. The apparatus described in claim 8, wherein:

each frame wall has a slot that receives one of said fingers.

* * * * *